(12) United States Patent
Mitani et al.

(10) Patent No.: US 9,009,941 B2
(45) Date of Patent: Apr. 21, 2015

(54) METHOD FOR MANUFACTURING AUTOMATIC TRANSMISSION

(75) Inventors: Akihiro Mitani, Hiroshima (JP);
Keiichiro Sueshige, Hiroshima (JP);
Tsuyoshi Kiyooka, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 430 days.

(21) Appl. No.: 13/583,898

(22) PCT Filed: Mar. 10, 2011

(86) PCT No.: PCT/JP2011/055635
§ 371 (c)(1),
(2), (4) Date: Oct. 25, 2012

(87) PCT Pub. No.: WO2011/111777
PCT Pub. Date: Sep. 15, 2011

(65) Prior Publication Data
US 2013/0061442 A1 Mar. 14, 2013

(30) Foreign Application Priority Data
Mar. 10, 2010 (JP) ................. 2010-053273

(51) Int. Cl.
*F16H 61/00* (2006.01)
*F16H 57/023* (2012.01)

(52) U.S. Cl.
CPC .............. *F16H 57/023* (2013.01); *F16H 61/00* (2013.01); *F16H 2061/0068* (2013.01)

(58) Field of Classification Search
CPC ................. B60K 23/02; B60R 25/003; F16H 2057/0043; F16H 2057/005; F16H 2057/0056; F16H 2057/0062; F16H 2057/0093; F16H 61/0006; F16H 61/0009; G01M 3/025; G01M 13/02; H05K 5/0082
USPC ....... 29/407.01, 592.1, 893.1, 428; 74/606 R, 74/730.1; 475/127–129, 116–123; 180/344; 701/51
See application file for complete search history.

(56) References Cited

U.S. PATENT DOCUMENTS 5,021,764 A * 6/1991 Mabee ........................ 340/439
5,042,133 A * 8/1991 Peterson et al. ............... 29/404

(Continued)

FOREIGN PATENT DOCUMENTS

EP        2042775 A2   4/2009
JP     2002-301994 A  10/2002
JP     2003-120811 A   4/2003

(Continued)

OTHER PUBLICATIONS

The English translation of the International Preliminary Report on Patentability dated Oct. 11, 2012, which corresponds to International Application No. PCT/JP2011/055635 and it related to U.S. Appl. No. 13/583,898.
International Search Report dated May 17, 2011; International Application No. PCT/JP2011/055635.
European Search Report; PCT/EP2011/055635; May 17, 2011.

*Primary Examiner* — David Bryant
*Assistant Examiner* — Jun Yoo
(74) *Attorney, Agent, or Firm* — Studebaker & Brackett PC (57) ABSTRACT

It is intended to make it possible to, even in a situation where a program and/or data to be written to a memory device of an electronic control unit provided in an automatic transmission become different in content, depending on a specification of a vehicle to be mounted with the automatic transmission, manage the electronic control unit while distinguishing only by a difference in hardware configurations thereof. Disclosed is a method which comprises: an assembling step (10) of assembling an automatic transmission, wherein the assembling step includes installing an electronic control unit in the automatic transmission; and a testing step (30) of testing the automatic transmission after completion of assembling in the assembling step (10), wherein a writing step (20) is performed after the assembling step (10) and before the testing step (30), to write vehicle-dependent information consisting of a program and/or data depending on a specification of a vehicle to be mounted with the automatic transmission, to a memory device of the electronic control unit installed in the automatic transmission.

19 Claims, 4 Drawing Sheets

(56) References Cited

U.S. PATENT DOCUMENTS

| | | | |
|---|---|---|---|
| 5,845,544 A * | 12/1998 | Huggins et al. | 74/606 R |
| 6,488,601 B1 * | 12/2002 | Sommer et al. | 474/70 |
| 7,055,405 B1 * | 6/2006 | Nitsche | 74/606 A |
| 2007/0078036 A1 * | 4/2007 | Morise | 475/159 |
| 2009/0088281 A1 | 4/2009 | Mizobe et al. | |
| 2011/0232409 A1 * | 9/2011 | Sueshige et al. | 74/473.11 |

FOREIGN PATENT DOCUMENTS

| | | |
|---|---|---|
| JP | 2003-314686 A | 11/2003 |
| JP | 2007-232185 A | 9/2007 |
| JP | 2009-085280 A | 4/2009 |

\* cited by examiner

METHOD FOR MANUFACTURING AUTOMATIC TRANSMISSION

TECHNICAL FIELD

The present invention relates to a method of manufacturing an automatic transmission having an electronic control unit, and belongs to the technical field of automatic transmissions designed to be mounted on vehicles.

BACKGROUND ART

An automatic transmission designed to be mounted on a vehicle is configured to selectively engage a plurality of frictional engagement elements depending on a driving state of the vehicle and thereby change a driving force transmission path from an engine to driving wheels to achieve a plurality of speed stages, and provided with an oil pressure control unit for controlling the engagement of the frictional engagement elements, and an electronic control unit for electrically controlling operation of the oil pressure control unit.

The oil pressure control unit is constructed by attaching a plurality of solenoid valves to a valve body having a control valve mechanism installed therein. In some cases, the electronic control unit is attached to the oil pressure control unit, and they are integrally installed in a casing of an automatic transmission, as disclosed in the following Patent Document 1. The electronic control unit is configured to receive signals from various sensors for detecting the driving state and output a control signal to the solenoid valves of the oil pressure control unit, thereby controlling an engaging oil pressure for each of the frictional engagement elements to automatically change between the speed stages depending on the driving state.

In order to adequately perform the above speed change control, even if a plurality of electronic control units are identical in terms of hardware configuration, a program and/or data for speed change control which vary depending on types of engine, tire and other component of a vehicle to be mounted with an automatic transmission having one of the electronic control units installed therein, or a grade or destination of the vehicle, i.e., depending on an individual specification of the vehicle to be mounted with the automatic transmission, are written to a memory device of each of the electronic control units.

Patent Document 1: JP 2009-85280 A

DISCLOSURE OF THE INVENTION

Problem to be Resolved by the Invention

As mentioned above, even if a plurality of electronic control units are identical in terms of hardware configuration, a program and/or data for speed change control or the like which vary depending on a vehicle specification are written to a memory device of each of the electronic control units. In this case, the electronic control units themselves become different components for each vehicle specification. Further, in the case where the electronic control units are managed in a state in which each of them is combined or integrated with the oil pressure control unit, a plurality of resulting assemblies each consisting of the electronic control unit and the oil pressure control unit also become different components for each vehicle specification.

Thus, before installation in automatic transmissions, the electronic control units or the assemblies each consisting of the electronic control unit and the oil pressure control unit have to be managed by a plurality of component numbers set differently for each specification of vehicles to be mounted with the automatic transmissions. Moreover, a large storage space is required, because they have to be stored while being sorted for each component number.

Therefore, the present invention is based on a technical problem of, even in the above situation where a program and/or data varying depending on each specification of vehicles to be mounted with the automatic transmissions are written to a memory device of each of the electronic control units, making it easy to perform management, storage, etc., of the electronic control units or assemblies each consisting of the electronic control unit and the oil pressure control unit, and thus attaining enhanced productivity of automatic transmissions.

Means for Resolving Problem

In order to solve the above technical problem, a method of manufacturing of an automatic transmission of the present invention is characterized in that it comprises as follows.

As described in claim 1, the present invention provides a method of manufacturing an automatic transmission having a transmission casing in which an electronic control unit for controlling a frictional engagement element is installed. The method is characterized in that it comprises: an assembling step of assembling an automatic transmission, wherein the assembling step includes installing the electronic control unit in the automatic transmission; a testing step of testing the automatic transmission after completion of assembling in the assembling step; and a writing step of writing vehicle-dependent information consisting of a program and/or data depending on a specification of a vehicle to be mounted with the automatic transmission, to a memory device of the electronic control unit installed in the automatic transmission, wherein the writing step is performed after the assembling step and before the testing step.

As described in claim 2, the method according to the claim 1 is characterized in that the assembling step includes an individual information acquisition step of acquiring AT-body individual information specific to the automatic transmission, wherein the writing step is configured to write the AT-body individual information acquired in the individual information acquisition step, to the memory device of the electronic control unit.

As described in claim 3, the method according to the claim 1 or 2 is characterized in that it comprises an ATF filling step of filling the automatic transmission with automatic transmission fluid (ATF), wherein the ATF filling step is performed after the assembling step and before the testing step, and wherein the writing step is performed in parallel with the ATF filling step.

As described in claim 4, the method according to any one of the claims 1 to 3 is characterized in that the automatic transmission is provided with an oil pressure control unit adapted to be controlled by the electronic control unit, and the ATF filling step includes an air releasing step of releasing air from the automatic transmission by executing the program written to the memory device of the electronic control unit to activate the oil pressure control unit, wherein the writing step is configured such that information writing to the memory device is not performed during the active state of the oil pressure control unit according to the program in the ATF filling step.

As described in claim 5, the method according to the claim 4 is characterized in that the writing step is configured such that, after termination of the air releasing step performed by executing the program, information writing to the memory device is performed by overwriting over the program.

As described in claim 6, the method according to the claim 4 or 5 is characterized in that, before the assembling step, the electronic control unit and the oil pressure control unit are preliminarily formed as a combined assembly, and then subjected to calibration, and assembly individual information obtained by the calibration is written to the memory device of the electronic control unit constituting the assembly, wherein the assembly step is configured to install the electronic control unit and the oil pressure control unit in the automatic transmission in the form of the assembly subjected to the calibration.

As described in claim 7, the method according to any one of the claims 1 to 6 is characterized in that management information which will become unnecessary after completion of the assembling step is preliminary written to the memory device of the electronic control unit, wherein the written step is configured such that information writing to the memory device is performed by overwriting over the management information.

As described in claim 8, the method according to any one of the claims 1 to 7 is characterized in that the testing step is configured to acquire information about an oil passage characteristic in the oil pressure control unit for each frictional engagement element, and write the information about the oil passage characteristic to the memory device.

Effect of the Invention

In accordance with the above feature of the method according to each of the claims, the following advantageous effect can be obtained.

In the method according to claim 1, during manufacturing of an automatic transmission, the writing step of writing the vehicle-dependent information consisting of a program and/or data depending on a vehicle to be mounted with the automatic transmission, to the memory device of the electronic control unit, is performed after the assembling step of assembling the automatic transmission while installing the electronic control unit in the automatic transmission and before the testing step of testing the automatic transmission, so that, in the assembling step, the electronic control unit is installed in the automatic transmission, in a state before it is individualized for each vehicle specification.

Thus, even if the vehicle-dependent information to be written to respective memory devices of a plurality of electronic control units varies in content, there is no need to perform management and storage or installation in automatic transmissions under a plurality of different component numbers so as to sort the electronic control units according to the variance. Therefore, as compared to the case where the management and others of the electronic control units are performed under the component numbers set differently for each of the contents in the memory devices, it becomes possible to enhance productivity of automatic transmissions, and reduce a component storage space as narrow as possible.

The electronic control unit may be connected to an oil pressure control unit to form an assembly, and then installed in the automatic transmission. In this case, only a difference in hardware configuration of the electronic control unit and oil pressure control unit may be distinguished by means of component number. Further, when there is no difference in hardware configuration thereof, it is only necessary to assign a single component number thereto. Therefore, as compared to the case where the management, storage and installation in automatic transmissions in the form of the assembly are performed under a plurality of component numbers set differently for each of the contents in the memory devices, it becomes possible to simplify the management and others and thereby enhance productivity of automatic transmissions.

In the method according to the claim 2, the AT-body individual information specific to a body of each automatic transmission, such as a piston stroke and a set load of a return spring in the frictional engagement element, is acquired in the assembling step, and the acquired information is written to the memory device of the electronic control unit in the writing step after the assembling step, so that, in the assembling step, the electronic control unit can be installed in the automatic transmission, in a state before it is individualized by the AT-body individual information. Thus, there is no need to manage the electronic control units by a plurality of component numbers set differently depending on the AT-body individual information, so that it becomes possible to reliably obtain the effects of the method according to the claim 1.

In the method according to the claim 3, the writing step is performed in parallel with the ATF (Automatic Transmission Fluid) filling step to be performed after the assembling step. Specifically, the ATF filling step includes an operation of injecting a predetermined amount of ATF into the automatic transmission, and an operation of releasing air remaining in each section of the automatic transmission, and it is necessary to take a certain time for these operations. Thus, by utilizing this time, writing of the vehicle-dependent information and the AT-body individual information to the memory device of the electronic control unit is performed in parallel with the ATF filling step. This makes it possible to reduce a total time required for manufacturing the automatic transmission and thereby further enhance the productivity of automatic transmissions, as compared to the case where the information writing is performed in a step other than the ATF filling step.

In the method according to the claim 4, when the automatic transmission is provided with the oil pressure control unit adapted to receive a signal from the electronic control unit and control an engaging oil pressure of the frictional engagement element, and the ATF filling step includes the air releasing step of executing the program written to the memory device of the electronic control unit to activate the oil pressure control unit, the writing step is configured such that information writing to the memory device is not performed during the active state of the oil pressure control unit according to the program, so that it becomes possible to avoid an increase in load of the electronic control unit due to simultaneous execution of the program for the air relief and the information writing to the memory device. This makes it possible to facilitate a reduction in cost, as compared to the case where the two operations are simultaneously executed, for example, because a low throughput CPU can be used.

In the method according to the claim 5, the writing step is configured such that, after termination of the air releasing step performed by executing the program, an unwritten part of the vehicle-dependent information and the AT-body individual information is written by overwriting it over the program for the air relief, so that it becomes possible to avoid a wasteful use of a capacity of the memory device caused by leaving the program after termination of the air relief, thereby facilitating a reduction in size or cost of the memory device.

In the method according to the claim 6, when, before the assembling step, the electronic control unit and the oil pressure control unit are preliminarily assembled together as an assembly, and then subjected to calibration, and the assembly individual information is written to the memory device of the electronic control unit, the assembly step is configured to install the electronic control unit and the oil pressure control unit in the automatic transmission in the form of the assembly subjected to the calibration, so that it becomes possible to eliminate a need for managing the electronic control unit and the oil pressure control unit separately depending on their characteristics, thereby further enhancing the productivity of automatic transmissions.

Specifically, each of the electronic control unit and the oil pressure control unit has a variation in characteristic, and therefore there is a need for control according to their characteristics. However, in the above method, they are assembled together and then subjected to calibration, and a result of the calibration is written as the assembly individual information to the memory device of the electronic control unit. This makes it possible to install the electronic control unit and the oil pressure control unit in the automatic transmission, considering only a difference in hardware configuration thereof, without taking into account variations in respective characteristics thereof.

Further, during speed change control or the like in a finished automatic transmission, the control can be performed by referring to the assembly individual information, without taking into account variations in respective characteristics of the electronic control unit and the oil pressure control unit, which makes it possible to attain simplification of a speed change control program.

In the method according to the claim 7, when information to be used only until completion of assembling of the automatic transmission, such as a serial number of a solenoid valve attached to the oil pressure control unit, i.e., information which is unrelated to a vehicle specification and which will become unnecessary after completion of the assembling of the automatic transmission, is preliminary written to the memory device of the electronic control unit, the written step is configured such that vehicle-dependent information and/or the AT-body individual information are written by overwriting them over the information no longer necessary, so that it becomes possible to avoid a wasteful use of the capacity of the memory device, thereby facilitating a reduction in size or cost of the memory device, as with the method according to the claim 5.

In the method according to the claim 8, the testing step is configured to acquire information about an oil passage characteristic in the oil pressure control unit for each frictional engagement element, and write the information about the oil passage characteristic to the memory device, so that it becomes possible to adequately perform the speed change control for the automatic transmission after being mounted on the vehicle, particularly, oil pressure pre-charge control during engagement of the frictional engagement element.

EXPLANATION OF NUMERALS 1 automatic transmission
5 oil pressure control unit
6 electronic control unit
8 assembly
60 memory device Best Mode for Carrying Out the Invention The present invention will now be described based on one embodiment thereof.

Figure 1:
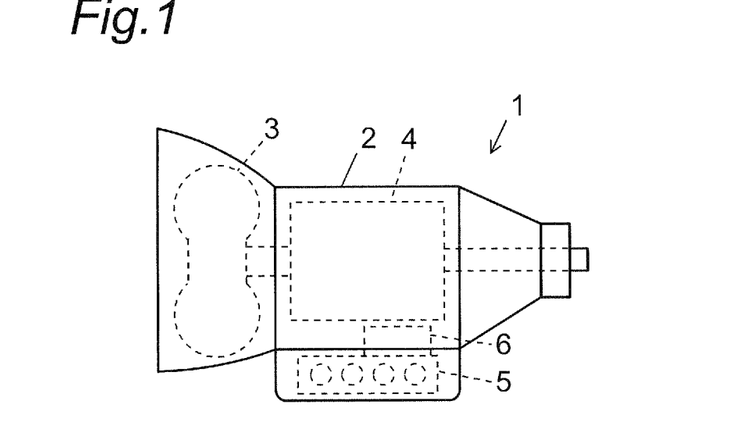
FIG. 1 is a schematic diagram of an automatic transmission to be manufactured by a method according to one embodiment of the present invention.

A schematic configuration of an automatic transmission to be manufactured by a method according to this embodiment will be described below. As illustrated in FIG. 1, the automatic transmission 1 has a transmission casing 2 and comprises a torque converter 3, a speed change mechanism 4 including a plurality of frictional engagement elements and a planetary gear train, an oil pressure control unit 5 for controlling an engaging oil pressure for each of the frictional engagement elements, and an electronic control unit 6 for electrically controlling an operation of the oil pressure control unit 5, which are installed in the transmission casing 2. The transmission casing 2 is filled with automatic transmission fluid (ATF).

Figure 2:
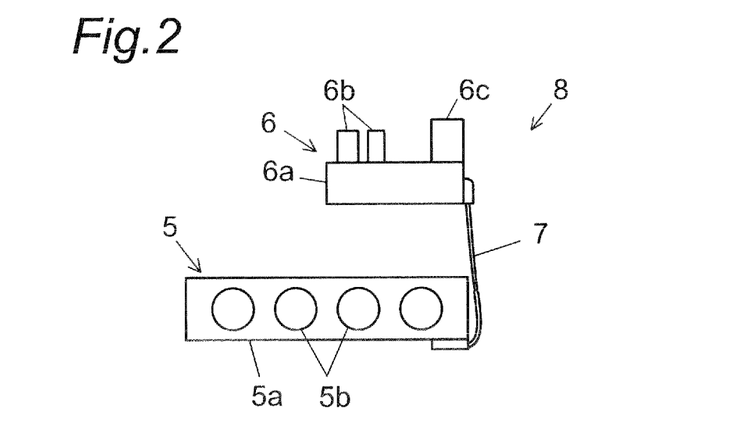
FIG. 2 is a schematic diagram of an assembly of an oil pressure control unit and an electronic control unit which are installed in the automatic transmission.

As illustrated in FIG. 2, the oil pressure control unit 5 is constructed by attaching a plurality of solenoid valves 5b for use in switching of oil passages and oil pressure control, to a valve body 5a having a control valve mechanism installed therein. The electronic control unit 6 has a unit body 6a having a built-in electronic circuit and comprises a sensor 6b for detecting a rotational speed of a predetermined rotatable member constituting the speed change mechanism 4, and a connector 6c for connection with a device outside the automatic transmission 1, which are provided in the unit body 6a.

The solenoid valves 5b of the oil pressure control unit 5 and the electronic control unit 6 are connected to each other by a harness 7, so that the oil pressure control unit 5 and the electronic control unit 6 are formed as an integrated assembly 8 and installed in the transmission casing 2 of the automatic transmission 1.

Figure 3:
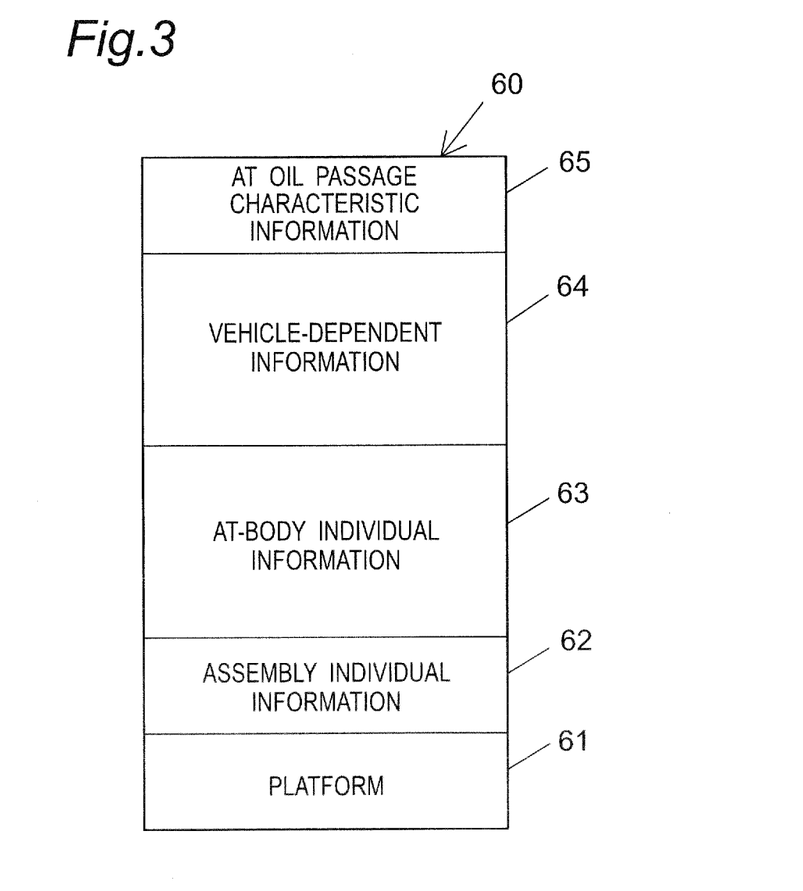
FIG. 3 is an explanatory diagram of information written to a memory device of the electronic control unit.

Further, a memory device using a ROM is installed in the unit body 6a of the electronic control unit 6. As illustrated in FIG. 3, this memory device 60 records thereon a platform 61, assembly individual information 62, AT-body individual information 63, vehicle-dependent information 64, and AT oil passage characteristic information 65.

The platform 61 is comprised of a basic control program essential to operation of the electronic control unit 6, such as CPU control, communication control, signal recognition control, and time management control.

The assembly individual information 62 is calibration data about the assembly 8 of the oil pressure control unit 5 and the electronic control unit 6 integrally installed in the automatic transmission 1. More specifically, it is information obtained by calibration which is performed in the state in which the oil pressure control unit 5 and the electronic control unit 6 are connected to each other by the harness 7, before the installation in the automatic transmission 1.

Specifically, the electronic control unit 6 is operable to output a current instructed by a CPU thereof, to each of the solenoid valves 5b of the oil pressure control unit 5, and each of the solenoid valves 5b is operable to generate an oil pressure corresponding to the current. However, in the electronic control unit 6, there is a variation in relationship between an instruction value indicative of a desired output current and a current value to be actually output. Moreover, in the oil pressure control unit 5, there is a variation in relationship between an input current of the solenoid valve 5b and an oil pressure to be generated.

Consequently, even if the CPU of the electronic control unit 6 instructs the solenoid valve 5b to output a current value corresponding to a desired oil pressure with a predetermined value to be generated, an error will occur between the desired oil pressure and an actual oil pressure actually generated by the solenoid valve 5b. Moreover, this error varies for each assembly 8 consisting of the oil pressure control unit 5 and the electronic control unit 6.

Therefore, before the installation in the automatic transmission 1, for each assembly 8 consisting of the oil pressure control unit 5 and the electronic control unit 6 connected to each other by the harness 7, the relationship between the instruction current and the actual oil pressure is preliminarily figured out by calibration, and resulting calibration data is recorded on the memory device 60 of the electronic control unit 6 to serve as the assembly individual information 62.

The AT-body individual information 63 is data such as a piston stroke and a set load of a return spring in each of the frictional engagement elements constituting the speed change mechanism 4, which is obtained, for example, by measurement of each section performed during assembling of an AT body of the automatic transmission 1 or just after completion of the assembling. More specifically, it is information for use in speed change control for the automatic transmission 1, etc.

The vehicle-dependent information 64 is a speed change schedule depending on a specification of a vehicle to be mounted with the automatic transmission 1, data such as definition information about (code indicative of a type of) a communication signal between the electronic control unit 6 and other system mounted on the vehicle, and a program for executing control using the data. In other words, it is information to be set depending on a specification of a vehicle to be mounted with the automatic transmission 1.

As used here, the term "other system" includes an engine control system, an antiskid brake system, and a dynamic stability control system.

The AT oil passage characteristic information 65 is information obtained in the aftermentioned testing step of testing the automatic transmission 1, and data about an oil passage communicated with each of the frictional engagement elements, which is obtained, for example, by measurement of a time after output of a speed change instruction signal through until the frictional engagement element is engaged and a turbine speed starts changing. More specifically, it is information for use, for example, in control of pre-charging an oil pressure to each of the frictional engagement elements during speed change.

A configuration of a manufacturing process for the above automatic transmission 1 will be described below in order of transition of a situation of information writing to the memory device 60 of the electronic control unit 6.

Figure 4:
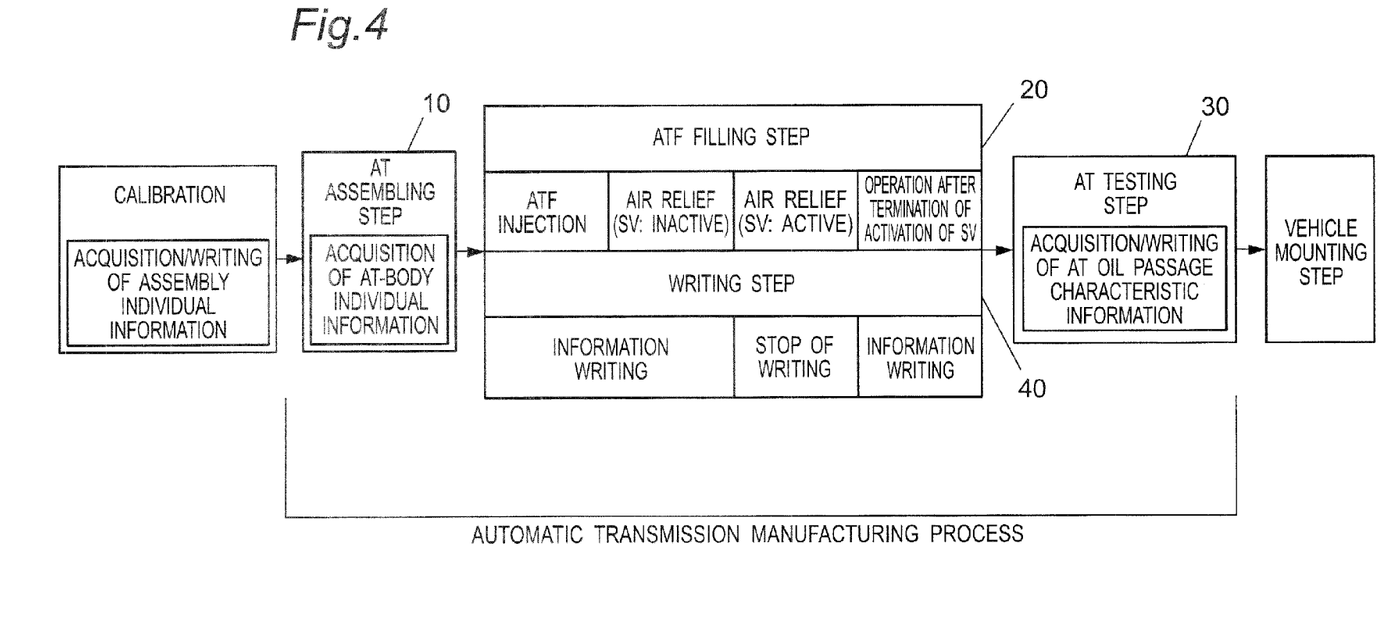
FIG. 4 is a process diagram of the automatic transmission manufacturing method according to the embodiment.

As illustrated in FIG. 4, the manufacturing process for the automatic transmission 1 comprises an AT assembling step 10, an ATF filling step 20, and an AT testing step 30. The automatic transmission 1 manufactured through these steps is conveyed to a vehicle assembling line and mounted on a vehicle.

Among the above steps, in the AT assembling step 10, various components supplied to a manufacturing line are sequentially installed in the transmission casing 2 independently or in the form of an assembly of two or more thereof. The component to be installed includes the torque converter 3, various components constituting the speed change mechanism 4, and the assembly 8 of the oil pressure control unit 5 and the electronic control unit 6 connected to each other by the harness 7.

Figure 5:
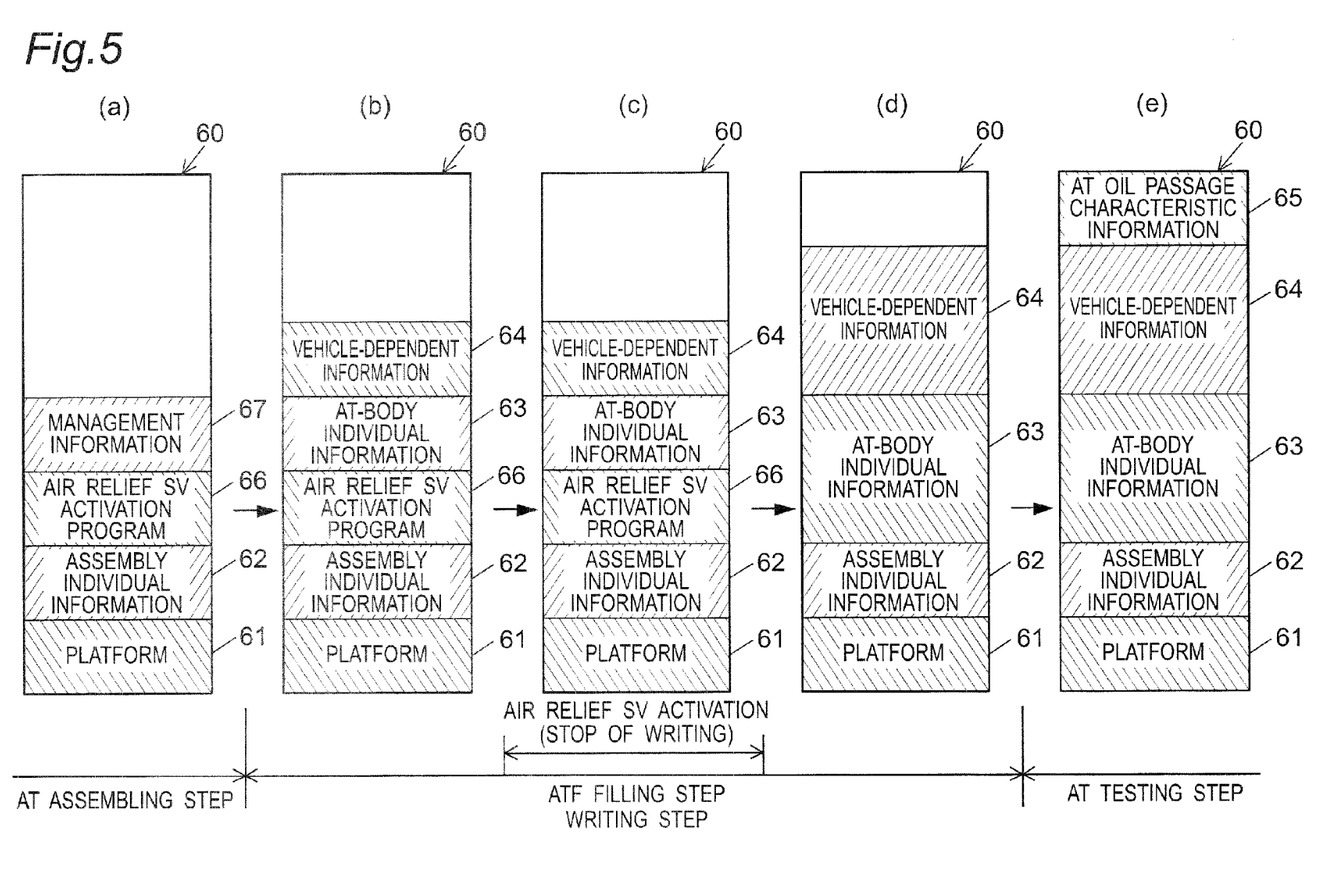
FIG. 5 is a transition diagram of a written state of the memory device.

Before the AT assembling step 10, the calibration for the assembly 8 has been preliminarily performed, and the aforementioned assembly individual information 62 obtained by the calibration has already been written to the memory device 60 of the electronic control unit 6 together with the platform 61, as illustrated in (a) of FIG. 5.

Further, before the installation of the assembly 8 in the transmission casing 2, an air relief SV activation program 66 and management information 67 have been written to the memory device 60, in addition to the platform 61 and the assembly individual information 62.

Among them, the air relief SV activation program 66 is designed to activate each of the solenoid valves 5b of the oil pressure control unit 5 through the electronic control unit 6, during an aftermentioned air relief operation after injection of ATF into the transmission casing 2, in the ATF filling step 20 to be performed after completion of the assembling of the automatic transmission 1. Thus, it will become unnecessary after termination of the air relief operation.

The management information 67 is component management information, such as a serial number of each of the solenoid valves 5b attached to the oil pressure control unit 5. More specifically, it is information which is unrelated to the automatic transmission 1 or a vehicle specification and which will become unnecessary after the assembly 8 of the oil pressure control unit 5 and the electronic control unit 6 is installed in the automatic transmission 1.

In the AT assembling step 10, in the course of the operation of installing components in the transmission casing 2 or after completion of the assembling, an operation of acquiring individual information about the AT body of the automatic transmission 1 is performed. More specifically, it is data such as a piston stroke and a set load of a return spring in each of the frictional engagement elements constituting the speed change mechanism 4. In other words, it is information specific to each AT body of automatic transmissions 1.

In the above manner, all of the required components are installed in the transmission casing 2 independently or in the form of an assembly to complete the AT assembling step 10. Subsequently, the ATF filling step 20 is performed.

As illustrated in FIG. 4, in the ATF filling step 20, an ATF injection operation and an air relief operation are performed. The ATF injection operation is performed such that a predetermined amount of ATF is injected into the transmission casing 2 from an ATF supply unit provided in the line, to fill an internal space of the torque converter 3 and an oil pan with ATF, while monitoring the automatic transmission 1.

The air relief operation is intended to discharge air remaining, after the injection of ATF, in the valve body 5a of the oil pressure control unit 5, the oil passage connecting from the valve body 5a to each of the frictional engagement elements, an oil pressure chamber of the frictional engagement element connected with the oil passage, the torque converter 3, etc. Specifically, a manual valve installed in the valve body 5a is moved using a special jig to release the air while changing a communication state of the oil passage, and then each of the solenoid valves 5b is activated to more reliably discharge the air.

In this operation, the solenoid valves 5b are activated by executing the air relief SV activation program 66 preliminarily written in the memory device 60 of the electronic control unit 6. More specifically, each of the solenoid valves 5b is activated at a predetermined timing according to a control signal output from the electronic control unit 6 thereto.

Through this operation, the air is discharged from each of the above sections, and the ATF is distributed over all sections of the automatic transmission 1.

Meanwhile, the ATF filling step 20 is required to take a certain time for the injection operation of injecting a predetermined amount of ATF and the air relief operation. Thus, by utilizing this time, a writing step 40 of writing various information to the memory device 60 of the electronic control unit 6 is performed. In other words, the writing step 40 is performed in parallel with the ATF filling step 20 as illustrated in FIG. 4.

As illustrated in (b) of FIG. 5, in the writing step 40, the AT-body individual information 63 acquired in the AT assembling step 10, the vehicle-dependent information 64 depending on a specification of a vehicle to be mounted with the automatic transmission 1, are written to the memory device 60. In this operation, among the information illustrated in (a) of FIG. 5, written to the memory device 60, the management information 67 will become unnecessary after completion of the installation of the assembly 8 in the automatic transmission 1, as mentioned above. Thus, the AT-body individual information 63 and the vehicle-dependent information 64 are written to the memory device 60 by overwriting over the management information 67.

As illustrated in (c) of FIG. 5, in the course of the ATF filling step 20, the air relief operation is performed by executing the air relief SV activation program 66. During the execution of this program 66, writing of the AT-body individual information 63 and the vehicle-dependent information 64 is stopped, and a content stored in the memory device 60 is maintained in a state before the activation of the solenoid valves 5b as illustrated in (b) of FIG. 5. This makes it possible to reduce a load on the CPU of the electronic control unit 6.

As illustrated in (d) of FIG. 5, in a situation where the air relief operation is continued even after termination of the activation of the solenoid valves 5b, or in a situation where the ATF injection operation is further continued in a state in which the solenoid valves 5b are deactivated, for example, when the ATF injection operation is restarted after termination of the air relief operation, an unwritten part of the AT-body individual information 63 and the vehicle-dependent information 64 is written during such a situation. At this timing, the air relief operation based on the execution of the air relief SV activation program 66 is terminated. Thus, the unwritten part of the information 63, 64 is written by overwriting over the program 66.

In this case, if the writing of the AT-body individual information 63 and the vehicle-dependent information 64 cannot be completed before termination of the ATF filling step 20, the writing step 40 will be continued until the writing is completed, even after the termination of the ATF filling step 20.

In a situation where the CPU of the electronic control unit 6 has a capacity enough to simultaneously perform the execution of the air relief SV activation program 66 and the writing to the memory device 60, the writing may be performed while executing of the air relief SV activation program 66. In this case, after termination of activation of the solenoid valves 5b, the unwritten part of the AT-body individual information 63 and the vehicle-dependent information 64 is also written by overwriting over the air relief SV activation program 66.

When the writing step 40 performed in parallel with the ATF filing step 20 is completed in the above manner, the management information 67 and the air relief SV activation program 66 becoming unnecessary after completion of the assembling of the automatic transmission 1 or after the ATF filling are erased, and, instead, the AT-body individual information 63 and the vehicle-dependent information 64 necessary for the speed change control, etc., after mounting on a vehicle, are written.

Then, the AT testing step 30 is performed, and the AT oil passage characteristic information 65 obtained by a predetermined test is additionally written to the memory device 60, so that the memory device 60 has a written content as illustrated in (e) of FIG. 5.

This state corresponds to a state just after completion of the manufacturing of the automatic transmission 1, as illustrated in FIG. 3. As mentioned above, the content includes the platform 61 common in all automatic transmissions 1 manufactured through the manufacturing process, the assembly individual information 62 obtained for each assembly 8 consisting of the oil pressure control unit 50 and the electronic control unit 6, the AT-body individual information 63 specific to each AT body of the automatic transmissions 1, the vehicle-dependent information 64 depending on a specification of a vehicle to be mounted with the automatic transmission 1, and the AT oil passage characteristic information 65 for each automatic transmission 1 obtained by a test after completion of the manufacturing of the automatic transmission 1, which are essential to the operation of the electronic control unit 6.

Thus, when any one of the automatic transmissions 1 getting through the test is conveyed to the vehicle assembling line, and mounted on a vehicle which is preliminary corresponded to the automatic transmission 1, the automatic transmission 1 can perform optimal speed change control depending on a specification of the vehicle mounted therewith.

As above, in the automatic transmission manufacturing method, in addition to the AT oil passage characteristic information 65 obtained in the testing step after completion of manufacturing of an automatic transmission, the AT-body individual information 63 specific to each AT body of the automatic transmissions, and the vehicle-dependent information 64 depending on a specification of a vehicle to be mounted with the automatic transmission, are written to the memory device 60 of the electronic control unit 6, after the AT assembling step 10 in which the electronic control unit 6 is installed in the transmission casing 2 of the automatic transmission, so that the electronic control unit 6 to be installed in the transmission casing 2 in the AT assembling step 10 is in a state before it is individualized for each automatic transmission or for each vehicle specification.

Thus, even if information to be written to respective memory devices of a plurality of electronic control units varies in content, there is no need to perform management and storage or installation in the transmission casings 2 under a plurality of different component numbers so as to sort the electronic control units according to the variance.

Each of the electronic control unit 6 and the oil pressure control unit 5 has a variation in characteristic. However, in the above method, they are preliminarily connected together by the harness 7 to form an assembly 8 and then subjected to calibration, and a result of the calibration is written as the assembly individual information 62 to the memory device 60, so that, even if the assembly 8 is installed in an automatic transmission having any specification, a given control can be performed by referring to the assembly individual information 62 according to need.

Thus, there is no need to install the assembly 8 in an automatic transmission while recognizing a difference in the assembly individual information 62 written to the memory device 60. This makes it possible to eliminate a need for performing assignment and management of a component number based on the difference, before the assembling. It is only necessary to assign a component number to the assembly 8, for example, when there is a difference in shape of the sensor 6b or in pin arrangement of the connector 6 in the electronic control unit 6, i.e., to perform management for coping with such a difference in hardware configuration.

Further, the writing step 40 of writing the AT-body individual information 63 and the vehicle-dependent information 64 to the memory device 60 is performed in parallel with the ATF filling step 20 to be performed after completion of the AT assembling step 10 before start of the AT testing step 30, so that the writing of the AT-body individual information 63 and the vehicle-dependent information 64 to the memory device 60 of the electronic control unit 6 is performed by utilizing a time required for injecting a predetermined amount of ATF into an automatic transmission 1 and releasing air. This makes it possible to reduce a total time required for manufacturing the automatic transmission 1, as compared to the case where the two steps 20, 40 are performed temporally separately.

In this operation, in the ATF filling step 20, information writing to the memory device 60 may be stopped during execution of the air relief SV activation program 66. This makes it possible to facilitate a reduction in size or cost of the CPU of the electronic control unit 6.

Further, in the writing step 40, the writing of the AT-body individual information 63 and the vehicle-dependent information 64 is performed by overwriting over the management information 67 which will become unnecessary after completion of the assembling, and the air relief SV activation program 66 which will become unnecessary after termination of activation of the solenoid valves 5b in the ATF filling step 20, so that it becomes possible to avoid a wasteful use of a capacity of the memory device 60 caused by leaving unnecessary information, such as the air relief SV activation program 66 and the management information 67, in the memory device 60 of the electronic control unit 6, thereby facilitating a reduction in size or cost of the memory device 60.

Industrial Applicability

As mentioned above, in an automatic transmission provided with an electronic control unit, even in a situation where information such as a program and/or data to be written to a memory device of the electronic control unit varies depending on a specification of a vehicle to be mounted with the automatic transmission, the present invention makes it possible to eliminate a need for managing the electronic control unit or an assembly of the electronic control unit and an oil pressure control unit, while distinguishing by content of the information. Thus, the present invention has a potential to be suitably used in the field of manufacturing industry of automatic transmissions or vehicles mounted with an automatic transmission.

The invention claimed is:

1. A method of manufacturing an automatic transmission having a transmission casing in which an electronic control unit for controlling a frictional engagement element is installed, comprising:
    an assembling step of assembling an automatic transmission, the assembling step including installing the electronic control unit in the automatic transmission;
    a testing step of testing the automatic transmission after completion of assembling in the assembling step; and
    a writing step of writing vehicle-dependent information consisting of a program and/or data depending on a specification of a vehicle to be mounted with the automatic transmission, to a memory device of the electronic control unit installed in the automatic transmission, the writing step being performed after the assembling step and before the testing step.

2. The method according to claim 1, wherein the assembling step includes an individual information acquisition step of acquiring AT-body individual information specific to the automatic transmission, and wherein the writing step is configured to write the AT-body individual information acquired in the individual information acquisition step, to the memory device of the electronic control unit.

3. The method according to claim 2, wherein it comprises an ATF filling step of filling the automatic transmission with automatic transmission fluid (ATF), the ATF filling step being performed after the assembling step and before the testing step, wherein the writing step is performed in parallel with the ATF filling step.

4. The method according to claim 3, wherein:
    the automatic transmission is provided with an oil pressure control unit adapted to be controlled by the electronic control unit; and wherein
    the ATF filling step includes an air releasing step of releasing air from the automatic transmission by executing the program written to the memory device of the electronic control unit to activate the oil pressure control unit,
    wherein the writing step is configured such that information writing to the memory device is not performed during the active state of the oil pressure control unit according to the program in the ATF filling step.

5. The method according to claim 4, wherein the writing step is configured such that, after termination of the air releasing step performed by executing the program, information writing to the memory device is performed by overwriting over the program.

6. The method according to claim 5, wherein before the assembling step, the electronic control unit and the oil pressure control unit are preliminarily formed as a combined assembly, and then subjected to calibration, and assembly individual information obtained by the calibration is written to the memory device of the electronic control unit constituting the assembly, and wherein the assembly step is configured to install the electronic control unit and the oil pressure control unit in the automatic transmission in the form of the assembly subjected to the calibration.

7. The method according to claim 6, wherein management information which will become unnecessary after completion of the assembling step is preliminary written to the memory device of the electronic control unit, and wherein the writing step is configured such that information writing to the memory device is performed by overwriting over the management information.

8. The method according to claim 7, wherein the testing step is configured to acquire information about an oil passage characteristic in the oil pressure control unit for each frictional engagement element, and write the information about the oil passage characteristic to the memory device.

9. The method according to claim 1, wherein it comprises an ATF filling step of filling the automatic transmission with automatic transmission fluid (ATF), the ATF filling step being performed after the assembling step and before the testing step, wherein the writing step is performed in parallel with the ATF filling step.

10. The method according to claim 9, wherein:
    the automatic transmission is provided with an oil pressure control unit adapted to be controlled by the electronic control unit; and wherein
    the ATF filling step includes an air releasing step of releasing air from the automatic transmission by executing the program written to the memory device of the electronic control unit to activate the oil pressure control unit, wherein the writing step is configured such that information writing to the memory device is not performed during the active state of the oil pressure control unit according to the program in the ATF filling step.

11. The method according to claim 10, wherein the writing step is configured such that, after termination of the air releasing step performed by executing the program, information writing to the memory device is performed by overwriting over the program.

12. The method according to claim 11, wherein before the assembling step, the electronic control unit and the oil pressure control unit are preliminarily formed as a combined assembly, and then subjected to calibration, and assembly individual information obtained by the calibration is written to the memory device of the electronic control unit constituting the assembly, and wherein the assembly step is configured to install the electronic control unit and the oil pressure control unit in the automatic transmission in the form of the assembly subjected to the calibration.

13. The method according to claim 12, wherein management information which will become unnecessary after completion of the assembling step is preliminary written to the memory device of the electronic control unit, and wherein the writing step is configured such that information writing to the memory device is performed by overwriting over the management information.

14. The method according to claim 13, wherein the testing step is configured to acquire information about an oil passage characteristic in the oil pressure control unit for each frictional engagement element, and write the information about the oil passage characteristic to the memory device.

15. The method according to claim 10, wherein before the assembling step, the electronic control unit and the oil pressure control unit are preliminarily formed as a combined assembly, and then subjected to calibration, and assembly individual information obtained by the calibration is written to the memory device of the electronic control unit constituting the assembly, and wherein the assembly step is configured to install the electronic control unit and the oil pressure control unit in the automatic transmission in the form of the assembly subjected to the calibration.

16. The method according to claim 15, wherein management information which will become unnecessary after completion of the assembling step is preliminary written to the memory device of the electronic control unit, and wherein the writing step is configured such that information writing to the memory device is performed by overwriting over the management information.

17. The method according to claim 16, wherein the testing step is configured to acquire information about an oil passage characteristic in the oil pressure control unit for each frictional engagement element, and write the information about the oil passage characteristic to the memory device.

18. The method according to claim 1, wherein management information which will become unnecessary after completion of the assembling step is preliminary written to the memory device of the electronic control unit, and wherein the writing step is configured such that information writing to the memory device is performed by overwriting over the management information.

19. The method according to claim 10, wherein the testing step is configured to acquire information about an oil passage characteristic in the oil pressure control unit for each frictional engagement element, and write the information about the oil passage characteristic to the memory device.

* * * * *